United States Patent [19]

Corrigan

[11] 3,987,706

[45] Oct. 26, 1976

[54] FILL AND RELIEF VALVE ARRANGEMENT

[75] Inventor: Ara L. Corrigan, Dunlap, Ill.

[73] Assignee: Caterpillar Tractor Co., Peoria, Ill.

[22] Filed: Sept. 22, 1975

[21] Appl. No.: 615,439

[52] U.S. Cl. ............................... 91/432; 137/596; 305/10
[51] Int. Cl.² ................... F15B 13/04; B62D 55/18
[58] Field of Search ............... 91/432; 137/596; 305/10

[56] References Cited
UNITED STATES PATENTS

| | | | |
|---|---|---|---|
| 2,634,756 | 4/1953 | Anderson | 91/449 X |
| 3,517,972 | 6/1970 | Williams | 305/10 |
| 3,924,904 | 12/1975 | Wagner et al. | 91/449 X |

Primary Examiner—Alan Cohan
Assistant Examiner—Gerald A. Michalsky
Attorney, Agent, or Firm—John W. Grant

[57] ABSTRACT

A fill and relief valve arrangement for the introduction of fluid into and the selective venting of fluid from a fluid chamber includes a fill valve adjustably positioned within an open ended bore formed in a body with one end of the bore in communication with the fluid chamber. In one position of the fill valve, a flared end portion thereof is in sealing engagement with a valve seat formed at the one end of the bore for isolating the fluid chamber from a vent port open to the atmosphere with the fill valve being adjustable for moving the flared end portion inwardly away from the valve seat to establish communication between the fluid chamber and the vent port for venting the fluid chamber to the atmosphere.

1 Claim, 2 Drawing Figures

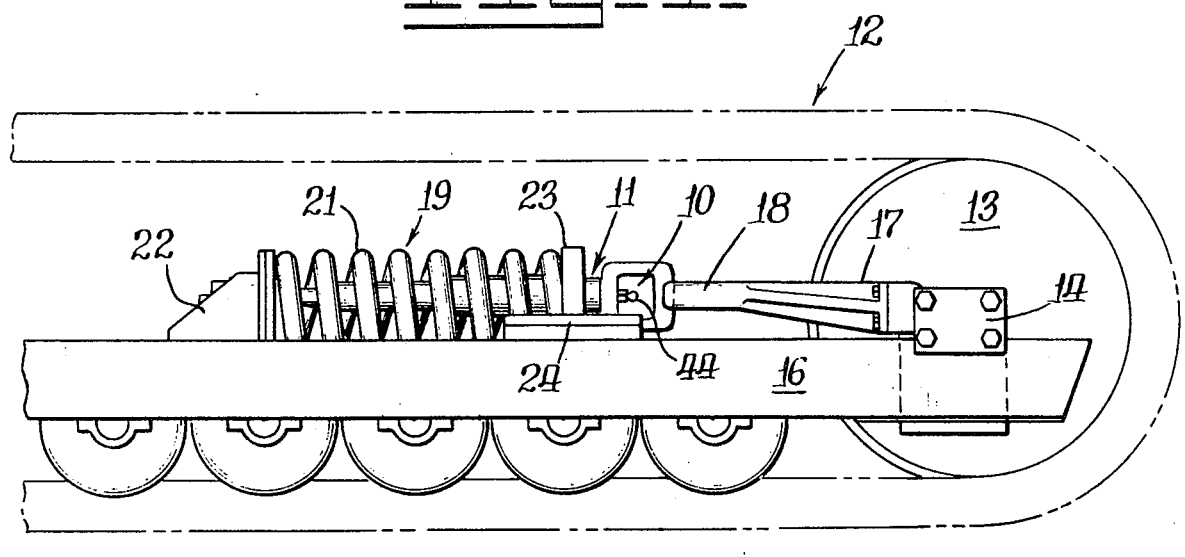
Fig_1_
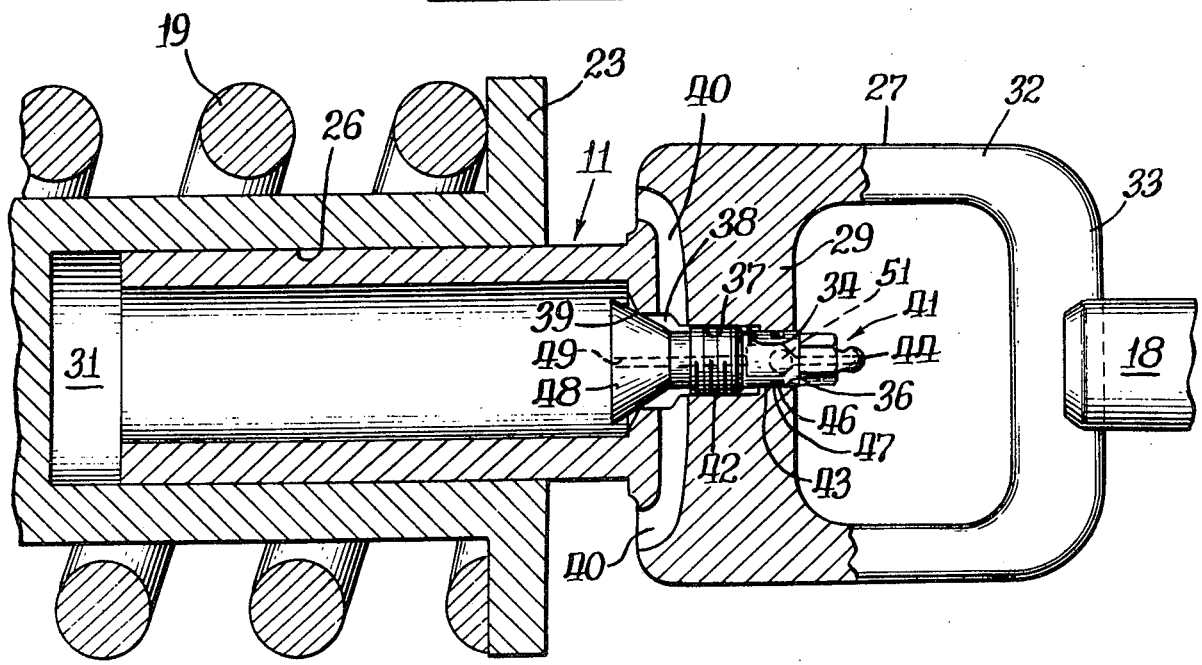
Fig_2_

FILL AND RELIEF VALVE ARRANGEMENT

BACKGROUND OF THE INVENTION

This invention relates to a fill and relief valve arrangement particularly adapted for the introduction of fluid into and the selective venting of fluid from a variable volume chamber of a hydraulic track adjuster.

Hydraulic track adjusters used on crawler tractors between the recoil spring and the idler commonly have a variable volume fluid chamber into which grease or oil is added to extend a piston or rod for tightening the track chain to compensate for wear to the track components. Many such track adjusters include a fill valve for adding pressurized fluid to the chamber and a separate relief valve for venting the chamber in preparation for disassembling the track chain or other track components. Occasionally, rocks, dirt, mud, etc. will become lodged between the track and idler and/or sprocket causing the recoil spring to be compressed and generating tremendous fluid pressure in the fluid chamber. To prevent the fill valve from being expelled by the pressurized fluid should it be removed without first venting the pressure, various devices have been employed to insure that the fluid pressure in the chamber is relieved prior to disassembling the track adjuster. Such devices include the addition of retainer shields to prevent the complete removal of the fill valve or relief valve until the pressure is relieved or the addition of bleed holes to vent the chamber to the atmosphere before either the fill valve or relief valve is removed, or a combination of both devices. Although these devices have been highly successful in alleviating the above problems, they are not readily adaptable to some types of hydraulic track adjusters.

OBJECTS OF THE INVENTION

Accordingly, an object of this invention is to provide an improved fill and relief valve arrangement for a hydraulic track adjuster.

Another object of this invention is to provide such an improved fill and relief valve arrangement which combines the function of both a fill valve and a relief valve into a single valve for the selective introduction of fluid into and the venting of fluid from a high pressure fluid chamber.

Another object of this invention is to provide an improved fill and relief valve arrangement of the character described which prevents the removal of the valve unless the fluid chamber is evacuated.

Other objects and advantages of the present invention will become more readily apparent upon reference to the accompanying drawings and following description.

BRIEF DESCRIPTION OF THE DRAWINGS

FIG. 1 is a side elevational view of a fill and relief valve arrangement embodying the principles of the present invention in association with a hydraulic track adjuster of a crawler track assembly.

FIG. 2 is an enlarged longitudinal sectional view of the fill and relief valve arrangement.

DESCRIPTION OF THE PREFERRED EMBODIMENT

Referring now to the drawing, a fill and relief valve arrangement embodying the principles of the present invention is generally indicated by the reference numeral 10 in association with a hydraulic track adjuster 11 of a crawler track assembly 12. The track assembly includes a idler 13 rotatably mounted between a pair of brackets, one shown at 14, slidably mounted on the forward end of a track roller frame 16. A yoke 17 is secured to the brackets and has a rearwardly extending member 18. A recoil mechanism 19 is mounted on the track roller frame rearwardly of the idler in the usual manner. The recoil mechanism includes a recoil spring 21 disposed in a compressed condition between a bulkhead 22 secured to the track roller frame and a slidable spring seat 23 which is normally in engagement with a pair of stops, one shown at 24.

As more clearly shown in FIG. 2, the spring seat also forms a part of the hydraulic track adjuster 11 and has a blind bore 26 formed therein opening toward the idler. A body 27 has an elongated tubular portion extending rearwardly from a generally annular web section 29 with the tubular portion slidably extending into the bore in telescopic fashion creating a variable volume fluid chamber 31. For purposes of the present invention, the fluid chamber is deemed to include the interior cavity of the tubular portion. The body also includes a forwardly extending mounting bracket 32 which has a vertically disposed rib 33 suitably engaged with the distal end of the yoke member 17. The distal end of the yoke member has a V-shaped notch, not shown, formed thereon for engagement with the rib for orienting the rib in the vertical direction. The mounting bracket and web section define a horizontally disposed opening 34 extending transversely through the body.

The web section has a stepped bore 34 extending therethrough concentric with the tubular portion and includes a smooth bore portion 36 adjacent the opening 34, an intermediate threaded portion 37, and a counterbore portion 38 which opens into the tubular portion and is thus in communication with the fluid chamber 31. A valve seat 39 is formed at the juncture of the counterbore portion and the web section. A pair of vent ports 40 connect the counterbore with the atmosphere.

A fill valve 41 is adjustably disposed within the stepped bore 34 and has an externally threaded portion 42 screw threaded into the threaded portion 37. A stem 43 extends outwardly through the smooth bore portion 36 and terminates in a generally spherical protuberance 44 of a size and shape for receiving a standard grease gun nozzle. An O-ring seal 46 is seated within an annular groove 47 formed in the stem 43. A flared conical end portion 48 is formed on the opposite end of the fill valve and is adapted for sealing engagement with the valve seat 39 to isolate the fluid chamber 31 from the vent ports 40. A fluid flow path 49 extends axially through the fill valve and has a check valve 51 disposed therein for permitting one-way communication of fluid therethrough in a direction for introducing fluid into the fluid chamber when the flared end portion of the fill valve is seated against the valve seat.

OPERATION

While the operation of the present invention is believed clearly apparent from the foregoing description, further amplification will subsequently be made in the following brief summary of such operation. The fill valve 41 is preassembled within the stepped bore 34 of the body 27 by screw threading the externally threaded portion 42 into the threaded portion 37 before the tubular portion is inserted into the bore 26 of the spring seat 23. With the flared end portion 48 seated against the valve seat 39 and the fluid chamber 31 filled with oil or grease, the hydraulic track adjuster 11 functions as a solid link between the yoke 17 and the recoil mechanism 19. When the track chain of the crawler track assembly 12 becomes slack due to wear in the track components, additional grease is pumped through the fluid flow path 49 and past the check valve 51 of the fill valve into the fluid chamber 31. The additional fluid in the chamber forces the tubular portion 28 to the right as viewed in the drawing thereby moving the yoke 17, brackets 16 and idler 13 to the right removing the slack from the track chain.

When the track chain becomes too tight or when it becomes necessary to vent the fluid chamber 31 in preparation for disassembling the crawler track assembly, the fill valve 41 is rotated in the appropriate direction for moving the flared end portion inwardly to move the flared end portion 48 away from the valve seat 39. In so doing, communication is established between the fluid chamber 31 and the vent ports 40 thereby venting the fluid chamber 31 to the atmosphere to relieve any fluid pressure generated in the chamber by the tension in the track chain.

In view of the foregoing, it is readily apparent that the structure of the present invention provides an improved fill and relief valve arrangement for a hydraulic track adjuster which functions as both a fill valve and a relief valve for the introduction of fluid into and the selective venting of fluid from a fluid chamber. Since the fluid chamber is vented by rotating the fill valve inwardly toward the fluid chamber, the fill valve cannot be completely removed until the fluid pressure in the fluid chamber is dissipated.

While the invention has been described and shown with particular reference to the preferred embodiment, it will be apparent the variations might be possible that would fall within the scope of the present invention which is not intended to be limited except as defined in the following claims.

What is claimed is:

1. A fill and relief valve arrangement for the introduction of fluid into and the selective venting of fluid from a variable fluid chamber, comprising;

a body disposed at one end of the variable volume fluid chamber and having an open-ended bore formed therein with one end of the bore opening into the fluid chamber, a valve seat formed at said one end of the bore, and a vent port communicating the bore with the atmosphere, said bore including a smooth bore portion at the other end thereof and a threaded portion intermediate the ends; and a fill valve having a fluid flow path extending axially therethrough, an externally threaded portion screw threaded into the threaded portion of the bore, a flared end portion partially disposed within the fluid chamber in sealing engagement with the valve seat isolating the fluid chamber from the vent port, a stem protruding through the fluid bore portion, and a check valve disposed in the fluid flow path for permitting one-way communication therethrough for directing pressurized fluid to the fluid chamber when the flared end portion is in sealing engagement with the valve seat, said fill valve being rotatable to move the flared end portion inwardly into the fluid chamber away from said valve seat for venting the fluid chamber to the atmosphere.

* * * * *